United States Patent
Frangos et al.

(10) Patent No.: US 11,632,468 B2
(45) Date of Patent: *Apr. 18, 2023

(54) INDUSTRY BENCHMARK FORECASTING IN WORKFORCE MANAGEMENT

(71) Applicant: NICE LTD., Ra'anana (IL)

(72) Inventors: Gregory E. Frangos, Lewis Center, OH (US); Thomas S. Otvos, Mississauga (CA)

(73) Assignee: NICE LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,345

(22) Filed: Nov. 21, 2022

(65) Prior Publication Data

US 2023/0078914 A1    Mar. 16, 2023

Related U.S. Application Data

(63) Continuation of application No. 17/673,486, filed on Feb. 16, 2022, now Pat. No. 11,522,999, which is a continuation of application No. 16/940,078, filed on Jul. 27, 2020, now Pat. No. 11,272,061.

(51) Int. Cl.
| | |
|---|---|
| *H04M 3/00* | (2006.01) |
| *H04M 3/523* | (2006.01) |
| *G06Q 10/067* | (2023.01) |
| *H04M 3/51* | (2006.01) |
| *G06Q 10/0631* | (2023.01) |

(52) U.S. Cl.
CPC ........ *H04M 3/5237* (2013.01); *G06Q 10/067* (2013.01); *G06Q 10/063114* (2013.01); *G06Q 10/063118* (2013.01); *H04M 3/5175* (2013.01); *H04M 3/5191* (2013.01)

(58) Field of Classification Search
CPC ............. H04M 3/5237; H04M 3/5175; G06Q 10/063114; G06Q 10/067
See application file for complete search history.

(56) References Cited

U.S. PATENT DOCUMENTS

| | | |
|---|---|---|
| 11,272,061 B2 | 3/2022 | Frangos et al. |
| 2011/0066498 A1 | 3/2011 | Wojcicki et al. |
| 2014/0280014 A1 | 9/2014 | Komissarchik et al. |
| 2022/0174156 A1 | 6/2022 | Frangos et al. |

*Primary Examiner* — Rasha S Al Aubaidi (74) *Attorney, Agent, or Firm* — Haynes and Boone, LLP (57) ABSTRACT

A method for providing anonymized contact information to a workforce management system includes receiving contact information from a plurality of customer business units; assigning each of the plurality of customer business units one or more industry classification codes or product classification codes; anonymizing, by a processor, the contact information to the one or more industry classification codes or product classification codes; receiving, by a processor, a query from a workforce management system for anonymized contact information in one or more industry classification codes or product classification codes; and providing the anonymized contact information to the workforce management system for use in a workforce management predictive model.

20 Claims, 5 Drawing Sheets

INDUSTRY BENCHMARK FORECASTING IN WORKFORCE MANAGEMENT

CROSS REFERENCE TO RELATED APPLICATION(S)

This application is a is a continuation application of U.S. patent application Ser. No. 17/673,486, filed Feb. 16, 2022, now allowed, which is a continuation application of U.S. patent application Ser. No. 16/940,078, filed Jul. 27, 2020, now U.S. Pat. No. 11,272,061, the entire contents of each of which is hereby incorporated herein by express reference thereto.

TECHNICAL FIELD

The present disclosure relates generally to predictive contact modeling in workforce management systems, and more specifically to systems and methods for providing historical contact data as input to predictive models in workforce management systems.

BACKGROUND

Methods for forecasting, planning, and analysis for contact processing centers, also known as call centers, are important for increasing the efficiency of contact processing centers. Workforce management (WFM) is an integrated set of processes that a company uses to optimize the productivity of its employees. For example, WFM includes applications that enable contact center management to forecast workloads and align staffing needs around those forecasts. WFM involves effectively forecasting labor requirements and creating and managing staff schedules to accomplish a particular task on a day-to-day and hour-to-hour basis.

The application of a WFM program within a contact processing center includes achieving and maintaining operational efficiency. This is done by ensuring that the right agents with the right skill sets are staffed at the right time.

WFM predictive models are currently restricted to using a customer business unit's historic data. This presents challenges for new business units that do not have historic data on a WFM platform. In addition, changes to products, services, or business volume might alter future predictive models, affecting the reliability of predictions. Contact center leadership cannot readily know if their predictive models are consistent with industry behaviors.

Accordingly, a need exists for improved systems and methods for improved, more accurate and efficient, predictive modeling in WFM.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The systems and methods described herein allow the combination of historical contact data and industry classifications to predict outcomes of contact models beyond human capabilities. Advantageously, the systems and methods use the massive data store of contact data across a wide range of customer business units to feed workforce management (WFM) predictive models. As used herein, "customer business units" or "business units" refer to customers for an automatic communication distributor (ACD) system or a WFM system.

ACDs are specialized systems that are configured to match contact communications to an available contact center agent. ACDs generally receive incoming communications, determine where to route a particular contact communication, and connect the contact communication to an available agent. For the purposes of the present disclosure, "ACD" refers to any combination of hardware, software and/or embedded logic that is operable to automatically distribute incoming communications, including requests for service transmitted using any audio and/or video means, including signals, data or messages transmitted through voice devices, text chat, web sessions, facsimile, instant messaging and e-mail.

The present disclosure solves the problem of the lack of historical contact data for new customer business units by using anonymized industry data to drive WFM predictive models. Specifically, customer business unit profiles are augmented to include industry and classification codes, using public domain classification hierarchies/taxonomies.

Initially, customer business units can decide whether or not to share their data with other customer business units.

Only if the customer business unit opts-in to share their data will their data be shared. In various embodiments, contact data from the customer business units who have opted-in to share their data is anonymized and aggregated based on specific contact metrics useful for forecasting (e.g., contact volume, average hold time, seasonality, ratio of virtual hold, and/or contact arrival patterns).

Forecasting allows for the contact center to predict future workloads based on historical data sets. The more historical data received allows for a more relevant picture of trends, analysis and patterns. Historical data can be collected from chat, email, web, etc. In addition to collecting historical data, insight into emerging trends that may impact volume differently from the historical data can be analyzed to better forecast and plan.

Anonymized contact data is then presented to a WFM system as inputs to contact volume, staffing, and/or other predictive models. In some embodiments, the contact volume and/or staffing models provide filters to display product or industry specific benchmarks.

The present disclosure provides immediate benefits to new customer business units, without the additional effort of migrating their historical contact data. It allows customer business units to forecast for new products and changes to contact volume and staffing levels that cannot be accomplished merely through their own, historical data. WFM systems generally perform forecasting using historical data for a specific customer business unit. Advantageously, the present systems and methods provide those WFM systems with anonymous, but same-industry-based data.

Moreover, the present systems and methods are able to collect contact data over a very wide selection of industries and map that contact data to specific industry or product codes. The present systems and methods can maintain a mapping of business units using multiple industry classification codes used, for example, globally, and not just a single classification system, which allows forecasting to be performed by customer business units that are not in a single geographic region and allows forecasting to be performed using data from related industries globally. New customer business units have immediate forecasting capability that is unique to the industry by leveraging the contact data from other customer business units.

Figure 1:
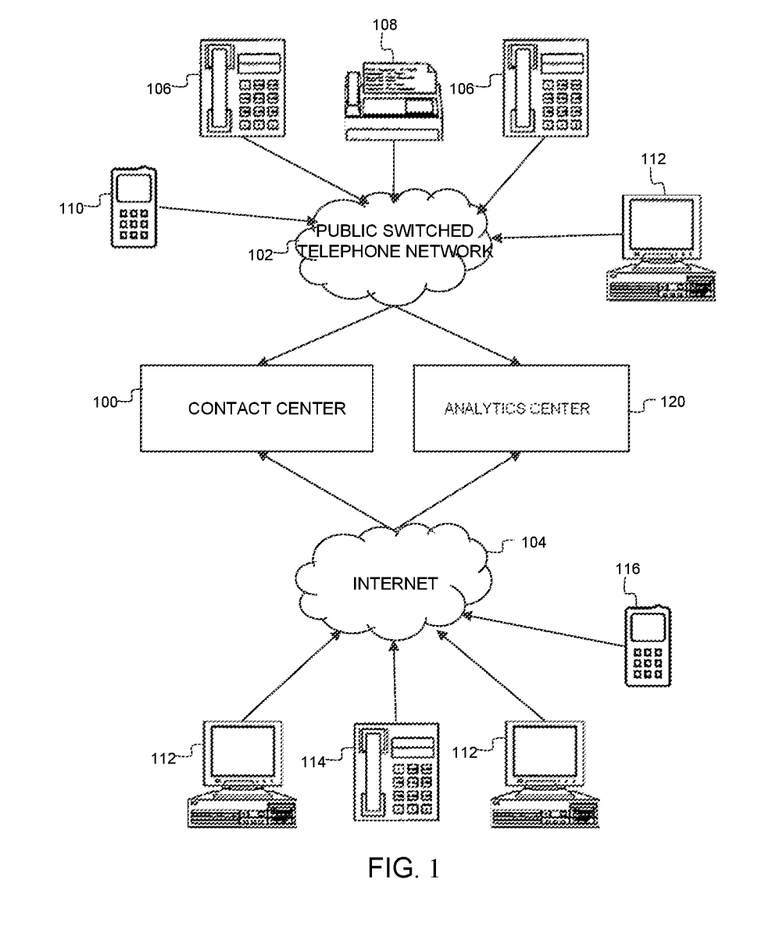
FIG. 1 is a simplified block diagram of an embodiment of a contact center according to various aspects of the present disclosure.

FIG. 1 is a simplified block diagram of an embodiment of a contact center 100 according to various aspects of the present disclosure. The term "contact center," as used herein, can include any facility or system server suitable for receiving and recording electronic communications from contacts. Such contact communications can include, for example, telephone calls, facsimile transmissions, e-mails, web interactions, voice over IP ("VoIP") and video. Various specific types of communications contemplated through one or more of these channels include, without limitation, email, SMS data (e.g., text), tweet, instant message, web-form submission, smartphone app, social media data, and web content data (including but not limited to internet survey data, blog data, microblog data, discussion forum data, and chat data), etc. In some embodiments, the communications can include contact tasks, such as taking an order, making a sale, responding to a complaint, etc. In various aspects, real-time communication, such as voice, video, or both, is preferably included. It is contemplated that these communications may be transmitted by and through any type of telecommunication device and over any medium suitable for carrying data. For example, the communications may be transmitted by or through telephone lines, cable, or wireless communications. As shown in FIG. 1, the contact center 100 of the present disclosure is adapted to receive and record varying electronic communications and data formats that represent an interaction that may occur between a contact (or caller) and a contact center agent during fulfillment of a contact and agent transaction. In one embodiment, the contact center 100 records all of the contact calls in uncompressed audio formats. In the illustrated embodiment, contacts may communicate with agents associated with the contact center 100 via multiple different communication networks such as a public switched telephone network (PSTN) 102 or the Internet 104. For example, a contact may initiate an interaction session through traditional telephones 106, a fax machine 108, a cellular (i.e., mobile) telephone 110, a personal computing device 112 with a modem, or other legacy communication device via the PSTN 102. Further, the contact center 100 may accept internet-based interaction sessions from personal computing devices 112, VoIP telephones 114, and internet-enabled smartphones 116 and personal digital assistants (PDAs).

Often, in contact center environments such as contact center 100, it is desirable to facilitate routing of contact communications, particularly based on agent availability, prediction of profile (e.g., personality type) of the contact occurring in association with a contact interaction, and/or matching of contact attributes to agent attributes, be it a telephone-based interaction, a web-based interaction, or other type of electronic interaction over the PSTN 102 or Internet 104.

As one of ordinary skill in the art would recognize, the illustrated example of communication channels associated with a contact center 100 in FIG. 1 is just an example, and the contact center may accept contact interactions, and other analyzed interaction information and/or routing recommendations from an analytics center, through various additional and/or different devices and communication channels whether or not expressly described herein.

For example, in some embodiments, internet-based interactions and/or telephone-based interactions may be routed through an analytics center 120 before reaching the contact center 100 or may be routed simultaneously to the contact center and the analytics center (or even directly and only to the contact center). Also, in some embodiments, internet-based interactions may be received and handled by a marketing department associated with either the contact center 100 or analytics center 120. The analytics center 120 may be controlled by the same entity or a different entity than the contact center 100. Further, the analytics center 120 may be a part of, or independent of, the contact center 100.

Figure 2:
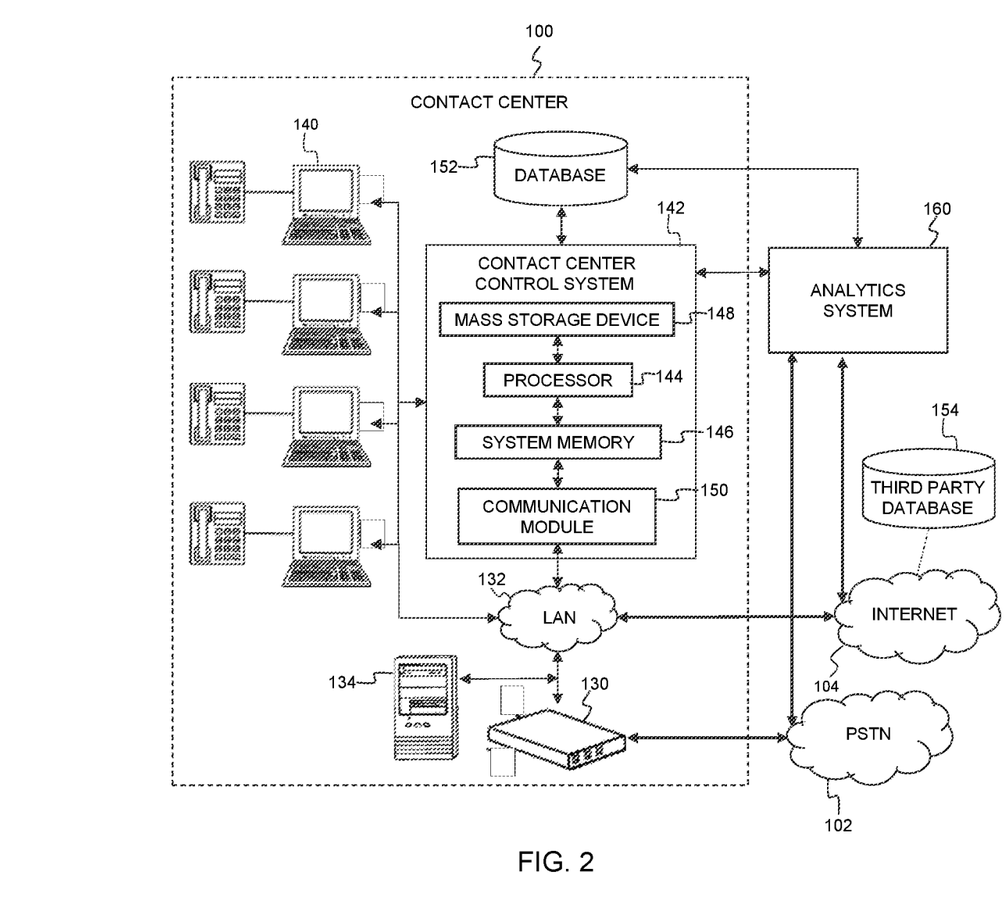
FIG. 2 is a more detailed block diagram of the contact center of FIG. 1 according to aspects of the present disclosure.

FIG. 2 is a more detailed block diagram of an embodiment of the contact center 100 according to aspects of the present disclosure. As shown in FIG. 2, the contact center 100 is communicatively coupled to the PSTN 102 via a distributed private branch exchange (PBX) switch 130 and/or ACD 130. The PBX switch 130 provides an interface between the PSTN 102 and a local area network (LAN) 132 within the contact center 100. In general, the PBX switch 130 connects trunk and line station interfaces of the PSTN 102 to components communicatively coupled to the LAN 132. The PBX switch 130 may be implemented with hardware or virtually. A hardware-based PBX may be implemented in equipment located local to the user of the PBX system. In contrast, a virtual PBX may be implemented in equipment located at a central telephone service provider that delivers PBX functionality as a service over the PSTN 102. Additionally, in one embodiment, the PBX switch 130 may be controlled by software stored on a telephony server 134 coupled to the PBX switch. In another embodiment, the PBX switch 130 may be integrated within telephony server 134. The telephony server 134 incorporates PBX control software to control the initiation and termination of connections between telephones within the contact center 100 and outside trunk connections to the PSTN 102. In addition, the software may monitor the status of all telephone stations coupled to the LAN 132 and may be capable of responding to telephony events to provide traditional telephone service. In certain embodiments, this may include the control and generation of the conventional signaling tones including without limitation dial tones, busy tones, ring back tones, as well as the connection and termination of media streams between telephones on the LAN 132. Further, the PBX control software may programmatically implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

ACD 130 distributes contact communications or tasks to agents. Generally, ACD 130 is part of a switching system designed to receive contact communications and queue them. In addition, ACD 130 as shown distributes communications to agents or specific groups of agents typically according to a prearranged scheme. In one embodiment, ACD 130 is integrated with PBX switch 130, and directs contact communications to one of a plurality of agent workstations 140.

According to an exemplary embodiment, ACD 130 includes a processor, a network interface, and a memory module or database. The network interface joins ACD 130 with LAN 132. Once ACD 130 receives a contact communication, the processor determines which of a plurality of agents should receive the communication. For example, the processor may access the memory module, which stores code executed by the processor to perform various tasks.

In various embodiments, the processor includes a plurality of engines or modules. Examples of suitable engines include a distributor engine, a queue engine, and a monitor engine. The distributor engine distributes incoming contact communications to available agents, the queue engine monitors and maintains contact communications that are waiting to be connected to agents, and the monitor engine checks the status and skills of agents and stores appropriate information in the memory module.

The memory module stores various information about agents at the contact center, including, but not limited to, agent skills or attributes, agent location, and agent availability. Various alternative embodiments of ACD 130 may store different or additional information useful for communication routing as well. Over time, monitor engine updates agent skills information, location information, and availability based on changes in agent status detected.

Generally, ACD 130 receives incoming communications that may be handled by one of the agents at the contact center. The distributor engine connects the communication to an appropriate available agent if the agent is available. If the agent is not available, the communication is generally held by the queue engine until the agent becomes available. While a contact is waiting for an agent, ACD 130 may collect data from the contact or perform other automated processes. Once the agent is available, the distributor engine routes the communication to the agent.

In an exemplary embodiment, ACD 130 is configured to perform attribute-based routing, which refers to routing incoming communications based on matching the attributes of the contact and the attributes of the agents. This ensures that communications go to agents with the correct attributes to ensure a better contact experience. Attribute-based routing considers the unique skills of individual agents and the preferences of individual contacts to route contact communications to the most qualified or most appropriate agent.

When a contact communication is received at ACD 130, the contact may first be identified (e.g., via the contact's touch-tone entry of an account number or identification number, caller ID, or identification number associated with the customer), and a contact profile may be retrieved from a database (e.g., database 152). Before connecting the communication, the database is typically queried to determine contact preferences. Agent information stored in memory module is also queried to determine which attributes of the agents match the preferences of the contact. Once a suitable agent is identified, distributor engine routes the communication to the appropriate agent workstation 140.

In one embodiment, the telephony server 134 includes a trunk interface that utilizes conventional telephony trunk transmission supervision and signaling protocols required to interface with the outside trunk circuits from the PSTN 102. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multimedia data images, video, text or audio.

The telephony server 134 includes hardware and software components to interface with the LAN 132 of the contact center 100. In one embodiment, the LAN 132 may utilize IP telephony, which integrates audio and video stream control with legacy telephony functions and may be supported through the H.323 protocol. H.323 is an International Telecommunication Union (ITU) telecommunications protocol that defines a standard for providing voice and video services over data networks. H.323 permits users to make point-to-point audio and video phone calls over a local area network. IP telephony systems can be integrated with the public telephone system through an IP/PBX-PSTN gateway, thereby allowing a user to place telephone calls from an enabled computer. For example, a call from an IP telephony client within the contact center 100 to a conventional telephone outside of the contact center would be routed via the LAN 132 to the IP/PBX-PSTN gateway. The IP/PBX-PSTN gateway would then translate the H.323 protocol to conventional telephone protocol and route the call over the PSTN 102 to its destination. Conversely, an incoming call from a customer over the PSTN 102 may be routed to the IP/PBX-PSTN gateway, which translates the conventional telephone protocol to H.323 protocol so that it may be routed to a VoIP-enable phone or computer within the contact center 100.

The contact center 100 is further communicatively coupled to the Internet 104 via hardware and software components within the LAN 132. One of ordinary skill in the art would recognize that the LAN 132 and the connections between the contact center 100 and external networks such as the PSTN 102 and the Internet 104 as illustrated by FIG. 2 have been simplified for the sake of clarity and the contact center may include various additional and/or different software and hardware networking components such as routers, switches, gateways, network bridges, hubs, and legacy telephony equipment.

As shown in FIG. 2, the contact center 100 includes a plurality of agent workstations 140 that enable agents employed by the contact center 100 to engage in contact interactions over a plurality of communication channels. In one embodiment, each agent workstation 140 may include at least a telephone and a computer workstation. In other embodiments, each agent workstation 140 may include a computer workstation that provides both computing and telephony functionality. Through the workstations 140, the agents may engage in telephone conversations with the customer, respond to email inquiries, receive faxes, engage in instant message conversations, text (e.g., SMS, MMS), respond to website-based inquires, video chat with a customer, and otherwise participate in various customer interaction sessions across one or more channels including social media postings (e.g., Facebook, LinkedIn, etc.). Further, in some embodiments, the agent workstations 140 may be remotely located from the contact center 100, for example, in another city, state, or country. Alternatively, in some embodiments, an agent may be a software-based application configured to interact in some manner with a customer. An exemplary software-based application as an agent is an online chat program designed to interpret customer inquiries and respond with pre-programmed answers.

The contact center 100 further includes a contact center control system 142 that is generally configured to provide recording, voice analysis, behavioral analysis, text analysis, storage, and other processing functionality to the contact center 100. In the illustrated embodiment, the contact center control system 142 is an information handling system such as a computer, server, workstation, mainframe computer, or other suitable computing device. In other embodiments, the control system 142 may be a plurality of communicatively coupled computing devices coordinated to provide the above functionality for the contact center 100. The control system 142 includes a processor 144 that is communicatively coupled to a system memory 146, a mass storage device 148, and a communication module 150. The processor 144 can be any custom made or commercially available processor, a central processing unit (CPU), an auxiliary processor among several processors associated with the control system 142, a semiconductor-based microprocessor (in the form of a microchip or chip set), a macroprocessor, a collection of communicatively coupled processors, or any device for executing software instructions. The system memory 146 provides the processor 144 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data, such as known voice prints, may be stored on the mass storage device 148. Examples of mass storage devices may include hard discs, optical disks, magneto-optical discs, solid-state storage devices, tape drives, CD-ROM drives, and/or a variety other mass storage devices known in the art. Further, the mass storage device may be implemented across one or more network-based storage systems, such as a storage area network (SAN). The communication module 150 is operable to receive and transmit contact center-related data between local and remote networked systems and communicate information such as customer interaction recordings between the other components coupled to the LAN 132. Examples of communication modules may include Ethernet cards, 802.11 WiFi devices, cellular data radios, and/or other suitable devices known in the art. The contact center control system 142 may further include any number of additional components, which are omitted for simplicity, such as input and/or output (I/O) devices (or peripherals), buses, dedicated graphics controllers, storage controllers, buffers (caches), and drivers. Further, functionality described in association with the control system 142 may be implemented in software (e.g., computer instructions), hardware (e.g., discrete logic circuits, application specific integrated circuit (ASIC) gates, programmable gate arrays, field programmable gate arrays (FPGAs), etc.), or a combination of hardware and software.

According to one aspect of the present disclosure, the contact center control system 142 is configured to record, collect, and analyze contact voice data and other structured and unstructured data, and other tools may be used in association therewith to increase efficiency and efficacy of the contact center. As an aspect of this, the control system 142 is operable to record unstructured interactions between contacts and agents occurring over different communication channels including without limitation telephone conversations, email exchanges, website postings, social media communications, smartphone application (i.e., app) communications, fax messages, texts (e.g., SMS, MMS, etc.), and instant message conversations.

As used herein, "contact information" or "contact data" includes contact voice data, and other structured and unstructured data collected over the different communication channels. In an exemplary embodiment, contact information includes specific contact metrics that are useful for forecasting the future workload of contact center agents. In some embodiments, the specific contact metrics include one or more of an average hold time, a contact arrival time, a ratio of virtual hold, seasonality, a contact volume, a contact duration, a contact wait time, or quality of service. As used herein, "average hold time" means the mean time elapsed between a communication arrival in a queue and when the communication is handled by an agent; "contact arrival time" means the time/day/date a contact arrived, or (as an aggregate) the number of contacts arriving in a given increment of time (e.g., the number of voice calls from 8 am to 9 am); "ratio of virtual hold" means the ratio of contacts that opt for an alternative contact method (leave a message, have an agent call you back, etc.) versus waiting for an agent in queue; "seasonality" means business-specific trends or industry-specific trends that affect contact volume; and "contact volume" means the number of voice calls or digital contacts in a given period of time (e.g., calls per minute), regardless of their arrival pattern.

The control system 142 may include a hardware or software-based recording server to capture the audio of a standard or VoIP telephone connection established between an agent workstation 140 and an outside contact telephone system. Further, the audio from an unstructured telephone call or video conference session (or any other communication channel involving audio or video, e.g., a Skype call) may be transcribed manually or automatically and stored in association with the original audio or video. In one embodiment, multiple communication channels (i.e., multi-channel) may be used, either in real-time to collect information, for evaluation, or both. For example, control system 142 can receive, evaluate, and store telephone calls, emails, and fax messages. Thus, multi-channel can refer to multiple channels of interaction data, or analysis using two or more channels, depending on the context herein.

In addition to unstructured interaction data such as interaction transcriptions, the control system 142 is configured to captured structured data related to customers, agents, and their interactions. For example, in one embodiment, a "cradle-to-grave" recording may be used to record all information related to a particular telephone call from the time the call enters the contact center to the later of: the caller hanging up or the agent completing the transaction. All or a portion of the interactions during the call may be recorded, including interaction with an interactive voice response (IVR) system, time spent on hold, data keyed through the caller's key pad, conversations with the agent, and screens displayed by the agent at his/her station during the transaction. Additionally, structured data associated with interactions with specific contacts may be collected and associated with each contact, including without limitation the number and length of calls placed to the contact center, call origination information, reasons for interactions, outcome of interactions, average hold time, agent actions during interactions with the contact, manager escalations during calls, types of social media interactions, number of distress events during interactions, survey results, and other interaction information. In addition to collecting interaction data associated with a contact, the control system 142 is also operable to collect biographical profile information specific to a contact including without limitation contact phone number, account/policy numbers, address, employment status, income, gender, race, age, education, nationality, ethnicity, marital status, credit score, contact "value" data (i.e., contact tenure, money spent as contact, etc.), personality type (as determined by past interactions), and other relevant contact identification and biological information. The control system 142 may also collect agent-specific unstructured and structured data including without limitation agent personality type, gender, language skills, technical skills, performance data (e.g., contact retention rate, etc.), tenure and salary data, training level, average hold time during interactions, manager escalations, agent workstation utilization, and any other agent data relevant to contact center performance. Additionally, one of ordinary skill in the art would recognize that the types of data collected by the contact center control system 142 that are identified above are simply examples and additional and/or different interaction data, contact data, agent data, and telephony data may be collected and processed by the control system 142.

The control system 142 may store recorded and collected interaction data in a database 152, including contact data and agent data. In certain embodiments, agent data, such as agent scores for dealing with contacts, are updated daily.

The control system 142 may store recorded and collected interaction data in a database 152. The database 152 may be any type of reliable storage solution such as a RAID-based storage server, an array of hard disks, a storage area network of interconnected storage devices, an array of tape drives, or some other scalable storage solution located either within the contact center or remotely located (i.e., in the cloud). Further, in other embodiments, the contact center control system 142 may have access not only to data collected within the contact center 100 but also data made available by external sources such as a third party database 154. In certain embodiments, the control system 142 may query the third party database for contact data such as credit reports, past transaction data, and other structured and unstructured data.

Additionally, in some embodiments, an analytics system 160 may also perform some or all of the functionality ascribed to the contact center control system 142 above. For instance, the analytics system 160 may record telephone and internet-based interactions, and/or perform behavioral analyses. The analytics system 160 may be integrated into the contact center control system 142 as a hardware or software module and share its computing resources 144, 146, 148, and 150, or it may be a separate computing system housed, for example, in the analytics center 120 shown in FIG. 1. In the latter case, the analytics system 160 includes its own processor and non-transitory computer-readable storage medium (e.g., system memory, hard drive, etc.) on which to store analytics software and other software instructions.

Figure 3:
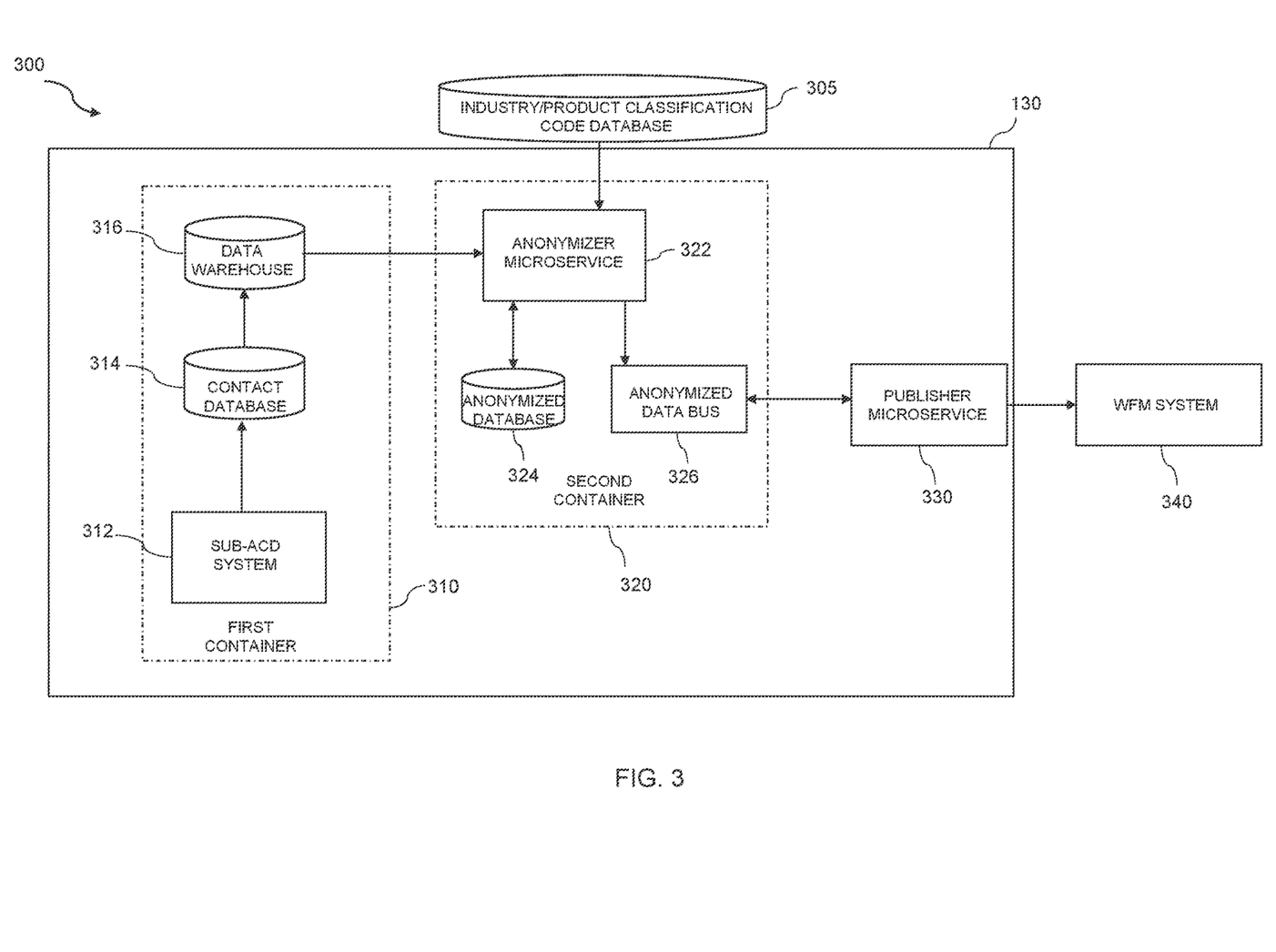
FIG. 3 is an exemplary computing environment suitable for implementing the present methods and systems, according to aspects of the present disclosure.

Referring now to FIG. 3, shown is an exemplary computing environment 300 where the present methods and systems may be implemented. The environment 300 includes ACD 130, industry and/or product classification code database 305, and WFM system 340. In this embodiment, ACD 130 includes a first container 310, a second container 320, and a publisher microservice 330.

The first container 310 includes a sub-ACD system 312 that includes WFM-enabled business units, a contact database 314, and a data warehouse 316. Contact information from sub-ACD system 312 may be moved to contact database 314, which summarizes the contact data. Summarized contact data may then be moved to data warehouse 316.

The second container 320 includes an anonymizer microservice 322, an anonymized database 324, and an anonymized data bus 326. Anonymizer microservice 322 collects contact summaries from data warehouse 316 and anonymizes the contact summaries to industry or product classification codes, which it receives from industry and/or product classification code database 305. Anonymized contact summary data from anonymizer microservice 322 (and the mapping of business units to industry or product classification codes) can be stored in anonymized database 324. Anonymized contact summary data from anonymizer microservice 322 can also be published to anonymized data bus 326.

Publisher microservice 330 collects anonymized contact summary data and pushes the anonymized contact summary data to WFM system 340, where the data can be used in predictive modeling.

According to various embodiments, real-time contact data is stored in the contact database 314, which is then moved to the data warehouse 316 using extract, transform, and load (ETL) jobs. As used herein, "ETL" refers to database functions that are combined into one tool to pull data out of one database and place it into another database. The anonymizer microservice 322 reads business unit contact summaries from data warehouse 316, receives industry or product classification codes from industry and/or product classification code database 305, and then uses the industry or product classification codes associated with each business unit to transform the contact summaries into anonymized, but industry-specific (or product-specific) contact summaries. In some embodiments, the contact summaries are then stored in anonymized database 324. The stored data can then be presented to WFM system 340, for example, via a publisher microservice 330 that receives the data through anonymized data bus 326 and sends the data in a way expected by the specific WFM system 340, without requiring any change to the WFM system 340.

Figure 4:
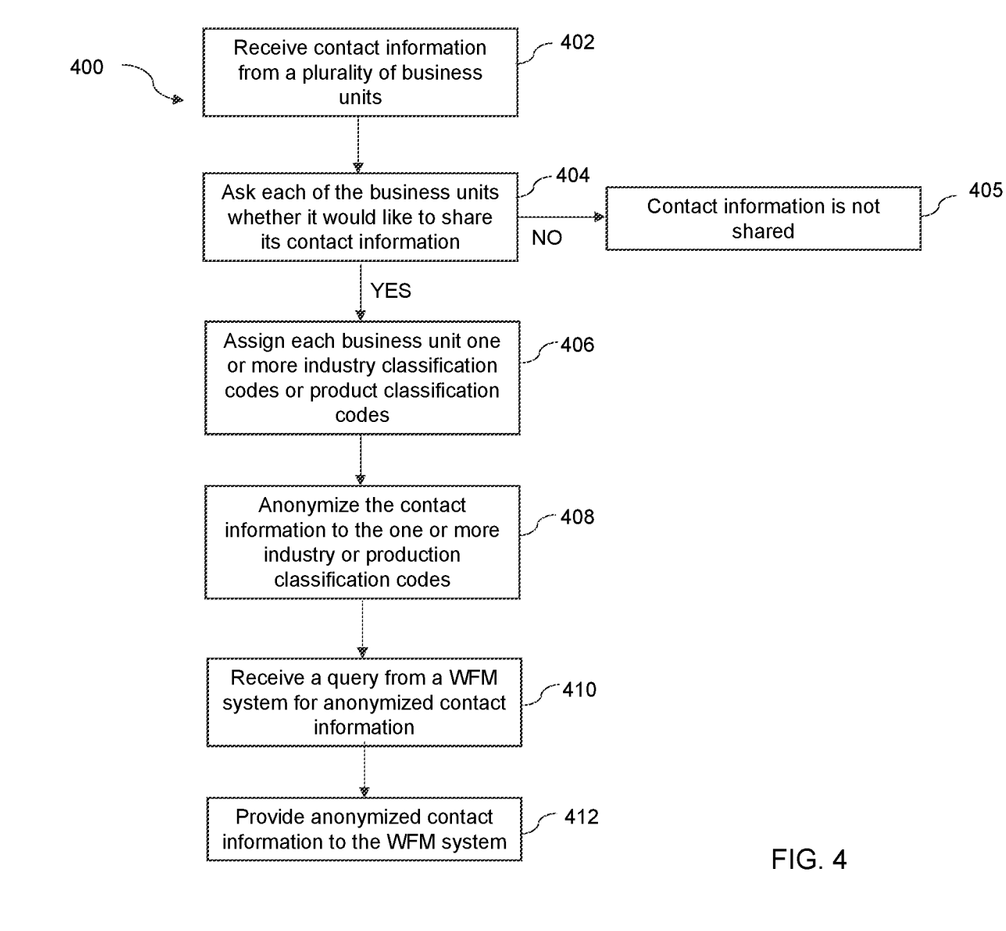
FIG. 4 is a flowchart of a method according to embodiments of the present disclosure.

Referring now to FIG. 4, a method 400 according to embodiments of the present disclosure is described. At step 402, ACD 130 receives contact information from a plurality of customer business units. Contact information includes contact voice data, and other structured and unstructured data collected over one, two, or more than two different communication channels (e.g., phone calls, emails, chats, faxes, texts, etc.) from customer business units.

At step 404, ACD 130 asks each of the plurality of business units whether it would like to share its contact information with other business units. If a business unit agrees to share its contact information, e.g., after first confirming such sharing is permitted under applicable law, customer consent, and/or business policies, the method 400 moves to step 406. If the business unit refuses to share its contact information, its data is not shared in step 405.

At step 406, ACD 130 assigns each of the plurality of customer business units who agreed to share their contact information one or more industry classification codes or product classification codes (e.g., SIC4, SIC6, NAICS, GPC, UNSPSC, CPV, or GS1). In some embodiments, the classification codes are national classification codes, regional classification codes, or global classification codes. For example, codes from the Standard Industrial Classification Codes (SIC), the North American Industry Classification System (NAICS), the Global Product Classification (GPC) Standards, the United National Standard Products and Services Code (UNSPSC), the Common Procurement Vocabulary (CPV), or GS1 barcodes may be used. One of ordinary skill in the art should understand that any suitable industry classification code or product classification code may be used, and that the present disclosure is not limited to those classification codes listed here. In various embodiments, the codes may change frequently, and the ACD 130 updates the one or more industry classification codes or product classification codes that are assigned. For example, ACD 130 may assign additional codes to the customer business units as new or different codes become available. In another embodiment, the codes assigned to the customer business units may be changed altogether if the previously assigned codes are no longer applicable and more accurate codes are available.

At step 408, ACD 130 anonymizes the contact information to the one or more industry classification codes or product classification codes. As used herein, "anonymize" means to remove identifying information from the contact information so that the original source of the contact information cannot be known. "Anonymizing" the contact information includes removing the business unit affiliated with the contact information so that the contact information cannot be associated with any business unit. In several embodiments, the business unit is replaced with one or more industry or product classification codes. In some embodiments, a subset of a business unit is also replaced with one or more industry or classification codes. In certain embodiments, ACD 130 stores the anonymized contact information.

In various embodiments, ACD 130 aggregates the anonymized contact information based on the one or more industry classification codes or product classification codes. In some embodiments, the aggregating is performed across multiple industry classification codes or product classification codes. This can be done because a code may have sub-codes to specify the industry or product more precisely, or because the codes are represented differently in different classification codes. Therefore, if business unit 100 has classifications "abc" and "def," and business unit 200 has classifications "def" and "ghi," then anonymized aggregations presented to business unit 300, which is a member of the "ghi" classification, could contain data from both business units 100 and 200.

Regardless of how the data is aggregated, the WFM systems can then use the anonymized data as they would use other historical contact data to develop, drive, or otherwise provide input to their predictive models. The publishing of data to WFM systems can be achieved in a variety of ways, and in several embodiments, anonymized data is provided to those WFM systems without requiring any changes to those systems.

In one embodiment, an agent skill (e.g., technology, sales, language, etc.) is replaced by a primary classification code used by the business unit, and this primary classification code can be used to aggregate and query the data. This data can then be passed to the WFM system as though the classification code is a "skill."

In an exemplary embodiment, the anonymization algorithm uses industry or product codes assigned to all customer business units that have not opted out, and assigns and aggregates contact information based on those codes. The WFM system can then query based on a specific code or across all related codes for a specific business unit to get relevant data for forecasting.

In various embodiments, ACD 130 summarizes the contact information before the contact information is anonymized. In one embodiment, the summarized contact information includes one or more of an average hold time, a contact arrival pattern, a ratio of virtual hold, seasonality, a contact volume, a contact duration, a contact wait time, or quality of service. One of ordinary skill in the art should understand that the summarized contact information may include other types of contact information, and that the above examples are not limiting.

At step 410, ACD 130 receives a query from a WFM system for anonymized contact information in one or more industry classification codes or product classification codes.

At step 412, ACD 130 provides the anonymized contact information to the WFM system for use in a WFM predictive model. For example, WFM system 340 may ask ACD 130 for contact information for product or classification code "1234." ACD 130 will push contact information that has a classification code of "1234" to WFM system 340.

In some embodiments, the anonymized contact information is provided to the WFM system continuously. For example, data is continuously made available to the WFM systems so that anonymized data can augment forecasting in an on-going fashion. This form of publishing uses existing mechanisms built into the WFM systems to ingest ACD contact data continuously. In the most general case, the data is placed on a message bus (e.g., anonymized data bus 326) that is read by specific publishers (e.g., publisher microservice 330) to present the data in WFM-specific ways.

In various embodiments, the contact information is presented to the WFM systems as "historical import" files that are consumed by the WFM systems as-needed to build predictive models or to modify existing predictive models. The anonymized contact data may be collected for an arbitrary period of time (or for a pre-set or a selected period of time, or based on another factor other than a time period), and imported by the WFM system in the usual mechanism provided by that system for consuming such data. In some embodiments, the WFM system can process the anonymized data as a one-time historical import, or it can subscribe to the anonymized data as a feed that allows the predictive models to be updated and/or allow a customer business unit to monitor industry-specific data on an on-going basis. Advantageously, the present disclosure allows WFM systems to leverage existing contact model and staffing prediction algorithms.

A specific example of the method 400 will now be described in detail. A series of test customer business units were tagged with industry classification codes. Then ETL jobs were written to transform their existing contact information into an anonymized form. The anonymized contact information was then processed using variations of existing stored procedures to export ACD contact data to the NICE IEX WFM system. The exported data had the same format as what was expected by the NICE IEX WFM system, but business unit-specific data was replaced by the industry code. Multiple customer business units shared the same industry code and the data presented was averaged across all customer business units.

Figure 5:
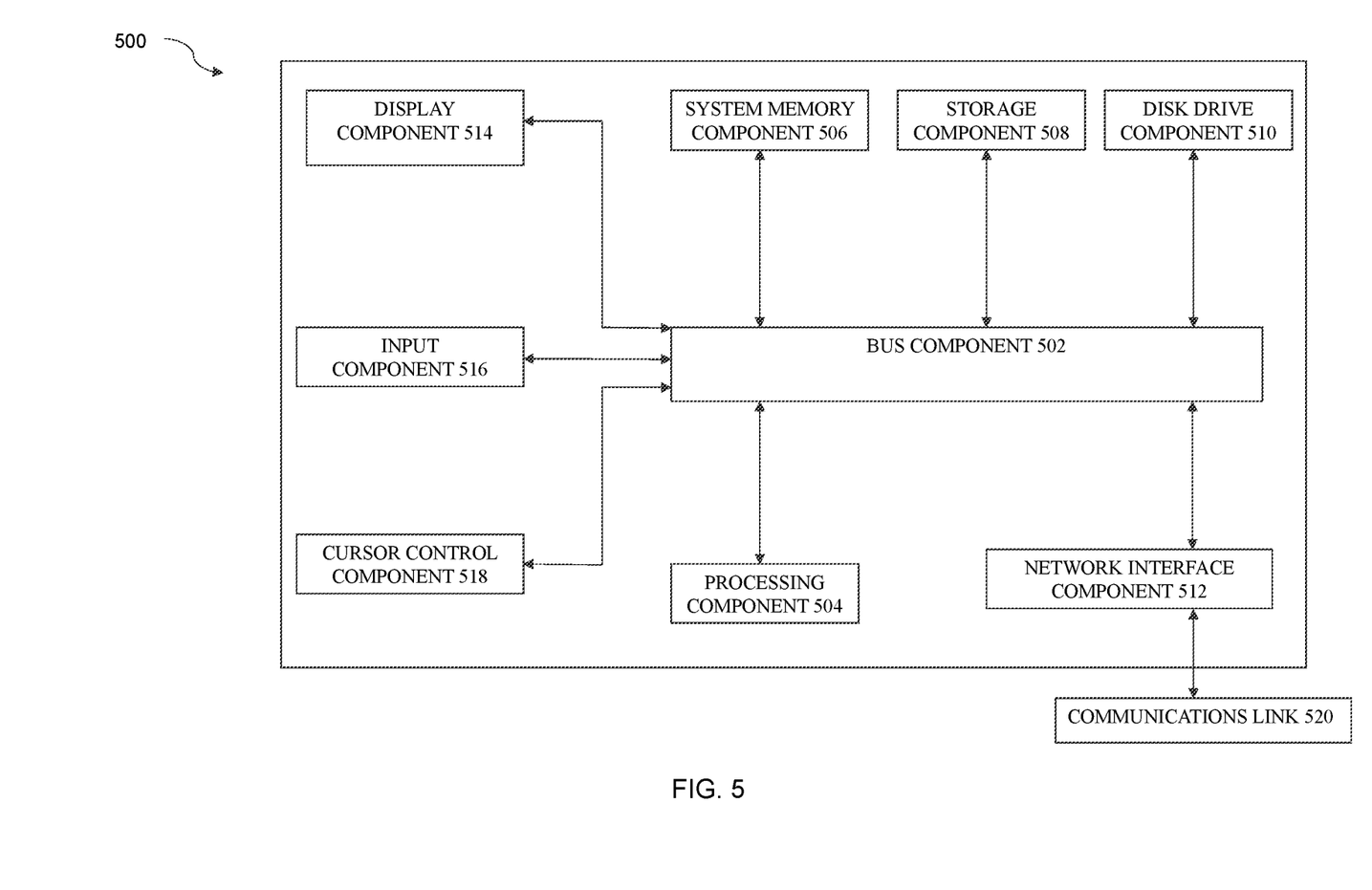
FIG. 5 is a block diagram of a computer system suitable for implementing one or more components in FIG. 1, 2, or 3 according to one embodiment of the present disclosure.

Referring now to FIG. 5, illustrated is a block diagram of a system 500 suitable for implementing embodiments of the present disclosure, including ACD 130. System 500, such as part a computer and/or a network server, includes a bus 502 or other communication mechanism for communicating information, which interconnects subsystems and components, including one or more of a processing component 504 (e.g., processor, micro-controller, digital signal processor (DSP), etc.), a system memory component 506 (e.g., RAM), a static storage component 508 (e.g., ROM), a network interface component 512, a display component 514 (or alternatively, an interface to an external display), an input component 516 (e.g., keypad or keyboard), and a cursor control component 518 (e.g., a mouse pad).

In accordance with embodiments of the present disclosure, system 500 performs specific operations by processor 504 executing one or more sequences of one or more instructions contained in system memory component 506. Such instructions may be read into system memory component 506 from another computer readable medium, such as static storage component 508. These may include instructions to assign each of the plurality of customer business units one or more industry classification codes or product classification codes, anonymize the contact information to the one or more industry classification codes or product classification codes, receive a query from a workforce management system for anonymized contact information in one or more industry classification codes or product classification codes, and provide the anonymized contact information to the workforce management system for use in a workforce management predictive model. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, volatile media includes dynamic memory, such as system memory component 506, and transmission media includes coaxial cables, copper wire, and fiber optics, including wires that comprise bus 502. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 500. In various other embodiments, a plurality of systems 500 coupled by communication link 520 (e.g., networks 102 or 104 of FIG. 2, LAN 132, WLAN, PTSN, or various other wired or wireless networks) may perform instruction sequences to practice the disclosure in coordination with one another. Computer system 500 may transmit and receive messages, data, information and instructions, including one or more programs (i.e., application code) through communication link 520 and communication interface 512. Received program code may be executed by processor 504 as received and/or stored in disk drive component 510 or some other non-volatile storage component for execution.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. An automatic communication distributor system comprising:
 a processor and a computer readable medium operably coupled thereto, the computer readable medium comprising a plurality of instructions stored in association therewith that are accessible to, and executable by, the processor, to perform operations which comprise:
 receiving, by the automatic communication distributor system, contact information from a plurality of customer business units;
 assigning, by an anonymizer service of the automatic communication distributor system, each of the plurality of customer business units one or more classification codes;
 anonymizing, by the anonymizer service, the contact information to the one or more classification codes;
 receiving, by a publisher service of the automatic communication distributor system, a query from a workforce management system for anonymized contact information in one or more classification codes; and
 providing, by the publisher service, the anonymized contact information to the workforce management system for use in the workforce management system.

2. The system of claim 1, wherein the one or more classification codes comprise one or more industry classification codes or product classification codes.

3. The system of claim 1, wherein the operations further comprise aggregating the anonymized contact information based on the one or classification codes.

4. The system of claim 3, wherein the aggregating is performed across multiple classification codes.

5. The system of claim 1, wherein the classification codes are global classification codes.

6. The system of claim 1, wherein the operations further comprise summarizing the contact information before the contact information is anonymized.

7. The system of claim 6, wherein the summarized contact information comprises one or more of an average hold time, a contact arrival pattern, a ratio of virtual hold, seasonality, a contact volume, a contact duration, a contact wait time, or quality of service.

8. The system of claim 1, wherein the operations further comprise updating the one or more classification codes.

9. The system of claim 1, wherein the anonymized contact information is provided to the workforce management system for use in a workforce management predictive model.

10. A method, which comprises:
 receiving, by an automatic communication distributor system, contact information from a plurality of customer business units;

assigning, by an anonymizer service of the automatic communication distributor system, each of the plurality of customer business units one or more classification codes;

anonymizing, by the anonymizer service, the contact information to the one or more classification codes;

receiving, by a publisher service of the automatic communication distributor system, a query from a workforce management system for anonymized contact information in one or more classification codes; and providing, by the publisher service, the anonymized contact information to the workforce management system for use in the workforce management system.

11. The method of claim 10, further comprising aggregating the anonymized contact information based on the one or more classification codes.

12. The method of claim 11, wherein the aggregating is performed across multiple classification codes.

13. The method of claim 10, further comprising summarizing the contact information before the contact information is anonymized.

14. The method of claim 10, further comprising updating the one or more classification codes.

15. The method of claim 10, wherein the anonymized contact information is provided to the workforce management system for use in a workforce management predictive model.

16. A non-transitory computer-readable medium having stored thereon computer-readable instructions executable by a processor to perform operations which comprise:

receiving, by an automatic communication distributor system, contact information from a plurality of customer business units;

assigning, by an anonymizer service of the automatic communication distributor system, each of the plurality of customer business units one or more classification codes;

anonymizing, by the anonymizer service, the contact information to the one or more classification codes;

receiving, by a publisher service of the automatic communication distributor system, a query from a workforce management system for anonymized contact information in one or more classification codes; and providing, by the publisher service, the anonymized contact information to the workforce management system for use in the workforce management system.

17. The non-transitory computer-readable medium of claim 16, wherein the operations further comprise aggregating the anonymized contact information based on the one or more classification codes.

18. The non-transitory computer-readable medium of claim 17, wherein the aggregating is performed across multiple classification codes.

19. The non-transitory computer-readable medium of claim 16, wherein the operations further comprise updating the one or more classification codes.

20. The non-transitory computer-readable medium of claim 16, wherein the anonymized contact information is provided to the workforce management system for use in a workforce management predictive model.

* * * * *